Figure 3:
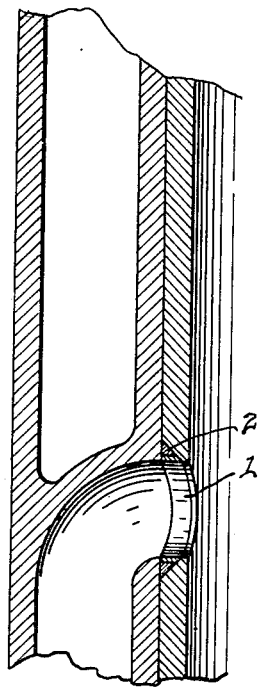

V. E. & R. G. NELSON.
METALLIC PACKING.
APPLICATION FILED SEPT. 20, 1912.

1,120,400.

Patented Dec. 8, 1914.

WITNESSES:
Richard Alspas.
Selene McDonald.

INVENTORS
Victor E. Nelson
Reynold G. Nelson
BY
Charles E. Vicar
ATTORNEY.

UNITED STATES PATENT OFFICE.

VICTOR E. NELSON AND REYNOLD G. NELSON, OF DETROIT, MICHIGAN, ASSIGNORS, BY DIRECT AND MESNE ASSIGNMENTS, OF FIFTY-ONE ONE-HUNDREDTHS TO SAID VICTOR E. NELSON AND FORTY-NINE ONE-HUNDREDTHS TO ALFRED T. HARROW, OF DETROIT, MICHIGAN.

METALLIC PACKING.

1,120,400. Specification of Letters Patent. Patented Dec. 8, 1914.

Application filed September 20, 1912. Serial No. 721,410.

*To all whom it may concern:*

Be it known that we, VICTOR E. NELSON and REYNOLD G. NELSON, citizens of the United States, residing at Detroit, county of Wayne, State of Michigan, have invented a certain new and useful Improvement in Metallic Packing, and declare the following to be a full, clear, and exact description of the same, such as will enable others skilled in the art to which it pertains to make and use the same, reference being had to the accompanying drawings, which form a part of this specification.

This invention relates to metallic packing for use with shafts and in other situations hereinafter described, and has for its object a simple and efficient packing in which wear is automatically compensated for and a tight joint continuously preserved and which is durable, inexpensive to manufacture and easily assembled in place.

This device is particularly adaptable for use for packing the crank shafts of two-cycle gas engines for preventing escape of compressed gas from the crank chamber and, as a further indication of its range of usefulness may be utilized at the port leading into the interior of a reciprocating hollow piston such as is disclosed in application, Serial No. 677,427, filed February 14, 1912, and indicated in the drawings filed herewith.

These and further objects of the invention are hereinafter more fully described and claimed and shown in the accompanying drawings in which—

Figure 4:
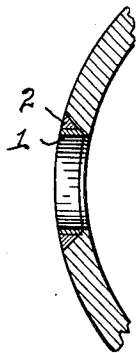
Figure 5:
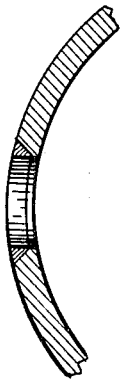
Figure 1:
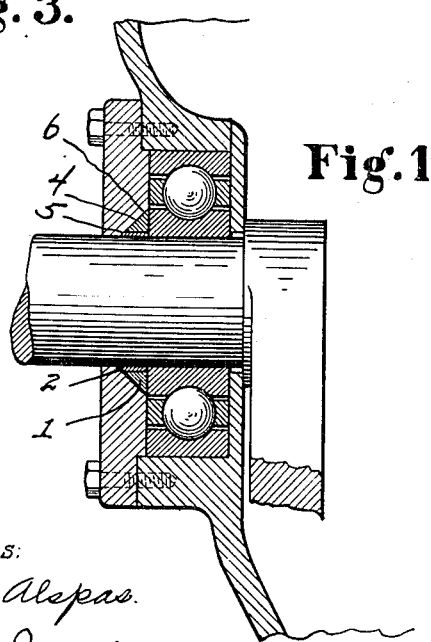
Figure 2:
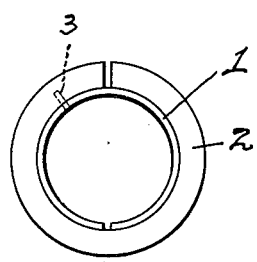

Figure 1 is a vertical section of a part of a crank shaft and crank case of an internal combustion engine showing the packing in position. Fig. 2 is a plan view of the packing rings. Fig. 3 is a vertical section of a portion of a gas engine cylinder showing the packing surrounding the inlet port leading to the explosive chamber. Fig. 4 is a section through the reciprocating piston taken at right angles to the line of section of Fig. 3. Fig. 5 is a like section showing the packing formed of a single split, spring-metal ring.

Similar characters refer to similar parts throughout the drawings and specification.

The packing preferably consists of a pair of concentric rings formed of spring metal, the inner ring 1 being preferably narrower in width than the outer ring 2. The two rings are secured together at a single point by means of a pin 3 in such manner that the open ends of the rings are not adjacent to each other as it may be seen in Fig. 2. One surface 4 and 5 of each of the rings 1 and 2 is preferably formed at an angle of substantially 45 degrees, as is shown more clearly in Fig. 1 which engages a seat 6 of like angularity and in assembling the rings in position on the seat they are necessarily compressed and when in position there is a constant tendency for the rings to expand and they therefore ride out on the seat and the faces of the rings tightly engage against the surface it is desired to pack.

As is well known, it is a difficult matter to so pack the crank shafts of gas engines in which the compression takes place in the crank case as to prevent a loss of gas thereabout and this is particularly true in such cases where ball-bearings are used. Fig. 1 shows the packing rings on the crank shaft of the engine with the bearing surface of the packing rings engaging against the ball race usually secured to the shaft and the angular seat or recess for the rings is formed in the cap or gland by means of which the bearings are held in place. In this structure it may be readily seen that the rings tightly engage both the annular seat in the gland and the surface of the ring forming the ball race whereby an escape of compressed gas in its usual path between the gland and the ball race is effectually prevented. In this instance the inner ring may be normally greater in diameter than the shaft about which it is positioned as the effectiveness of the packing is not enhanced by its closely engaging the shaft.

In Fig. 3 we have shown the rings as adapted for use at the inlet port to the explosion of a gas engine of peculiar construction and in this instance the annular seat or recess for the rings is formed in the piston wall and by their constant tendency to expand the rings closely engage the cylinder wall and prevent an escape of gas in the interstice between the cylinder wall and the wall of the piston. As shown more fully in Fig. 4 the contour of the outer or the packing face of the ring conforms to the contour of the piston, otherwise the ring is identical in structure and form with that shown in Figs. 1 and 2.

By the formation of the packing of the two concentric rings as shown, each ring forms a closure for the opening between the ends of the other ring and by pinning them together at one point as shown, the open ends of the rings are held in their desired relation.

An alternative form of the packing is shown in Fig. 5, in which a single, split, spring-metal ring having a tapered or cone surface, seats in a like tapered recess. In many instances this form will prove sufficiently effective for all practical purposes as the only leakage possible may occur between the open ends of the ring which, evidently, may be of little or no consequence. With this one exception, the single ring is identical in action with that of the concentric rings.

It is to be noted that the tapered surface of either the single or the concentric rings is greater in length than the thickness of the ring. While this may be natural to its formation in the manner shown, it is of considerable value especially when utilized in the manner shown in Fig. 1 in which the face of the ring bears against a rotating element, as the friction between the ring and the rotating element against which it presses is less than the friction of the ring in its seat. The ring therefore remains stationary in the seat and does not rotate with the rotating surface against which it engages.

Having thus briefly described our invention, what we claim is—

1. A metallic packing comprising a split ring of spring metal having a tapered outer surface and a seat therefor having a like tapered surface whose diameter is less than the normal outer diameter of the ring.

2. A metallic packing comprising a pair of split, concentric rings of spring metal, one surface of the rings being uniformly tapered to jointly provide a single cone surface, and a seat for said rings formed with a corresponding taper, the diameter of which is less than the normal diameter of the tapered surface of the rings.

3. A metallic packing comprising a pair of split, concentric, rings of spring metal, the outer surface of each of the rings being uniformly tapered, and a seat for said rings formed with a like taper, the diameter of which is less than the normal outer diameter of the rings.

4. A metallic packing comprising a pair of split, concentric rings of spring material, one surface of the rings being uniformly tapered and the two rings being pinned together in a manner to break joints, and a seat for the rings having a taper corresponding to the tapered surface of the rings the diameter of which is less than the normal diameter of the tapered surface of the rings.

5. A metallic packing for the purpose described comprising a pair of split, concentric, rings of spring metal so relatively disposed as to break joints, means for maintaining the rings in their relative position, one surface of each ring being uniformly tapered, and a seat for said rings formed with a like taper, the diameter of which is less than the normal diameter of the tapered surface of the rings.

6. A metallic packing comprising a pair of split concentric rings of spring material, one surface of the assembled rings being uniformly tapered, and a seat for the rings formed with a corresponding taper, the diameter of which is less than the normal diameter of the tapered surface of the rings.

7. A metallic packing comprising a split ring of spring material having a tapered or cone surface and a seat therefor having a correspondingly tapered surface, the diameter of which is less than the diameter of the tapered surface of the ring.

8. A metallic packing comprising a split ring of spring material the outer surface of which is tapered, and a recess or container therefor of a depth substantially equal to the length of the ring and having a wall formed with a taper corresponding with the tapered surface of the ring the diameter of which is less than the outer diameter of the ring.

9. A metallic packing comprising a pair of split rings of spring material concentrically disposed in a manner to break joints, and a recess or container therefor of a depth substantially equal to the length of the assembled rings and having a wall formed with a taper, a surface of the assembled rings being formed with a corresponding taper whereby both rings may seat against the tapered surface of the recess the diameter of which is less than the diameter of the tapered surface of the rings.

10. A metallic packing comprising a split ring of spring metal provided with a tapered surface greater in length than the thickness of the ring, and a seat therefor provided with a surface of a like taper whose diameter is less than the normal diameter of the tapered surface of the ring.

11. A metallic packing comprising a pair of split concentric rings of spring metal, a surface of the assembled rings being uniformly tapered, the length of the tapered surfaces of the assembled rings being greater than the thickness of the two rings, and a seat for said rings provided with a surface having a like taper the diameter of which is less than the diameter of the tapered surface of the rings.

12. A metallic packing comprising a split ring of spring metal having a tapered outer surface and a seat therefor having a like tapered surface of a fixed diameter less than the normal outer diameter of the ring.

13. A metallic packing for rods, shafts, etc., comprising a pair of concentric rings of spring metal, both of said rings being uniformly tapered to jointly provide a single cone surface, and a seat for said rings also formed with a cone surface engaged by the cone surface of the rings whose diameter is less than the normal diameter of the cone surface of the rings, the inner diameter of the inner ring when seated being greater than that of the rod on which it is positioned.

14. A metallic packing for rods, shafts, etc., comprising a split ring of spring metal having a tapered outer surface, a seat therefor having a like tapered surface of less diameter than the tapered surface of the ring, and means for holding the ring on the seat, the inner diameter of the ring when seated being greater than the diameter of the rod about which it is positioned.

In testimony whereof, we, sign this specification in the presence of two witnesses.

VICTOR E. NELSON.
REYNOLD G. NELSON.

Witnesses:
ALFRED T. HARROW,
CHARLES E WISNER.